US006938376B2

(12) United States Patent
Youssef

(10) Patent No.: US 6,938,376 B2
(45) Date of Patent: Sep. 6, 2005

(54) DOOR REINFORCEMENT SYSTEM

(76) Inventor: Magdy Morssi Youssef, 53 Grist Mill Rd., Wanaque, NJ (US) 07465

( * ) Notice: Subject to any disclaimer, the term of this patent is extended or adjusted under 35 U.S.C. 154(b) by 121 days.

(21) Appl. No.: 10/385,928

(22) Filed: Mar. 11, 2003

(65) Prior Publication Data

US 2004/0177561 A1 Sep. 16, 2004

(51) Int. Cl.[7] .......................... E05B 65/06; E05C 1/02; B64C 1/14
(52) U.S. Cl. .......................... 49/394; 292/137; 292/32; 114/201 R; 244/129.5; 244/118.5
(58) Field of Search .................. 49/394, 395, 501, 49/449, 503; 114/201 R; 244/118.5, 129.4, 129.5; 292/40, 42, 57, 58, 159, 137, 32, 150, 302, DIG. 29

(56) References Cited

U.S. PATENT DOCUMENTS

| | | | | |
|---|---|---|---|---|
| 1,018,887 A | * | 2/1912 | Dumbler | 292/57 |
| 2,035,074 A | * | 3/1936 | Kauffman | 292/58 |
| 2,156,635 A | * | 5/1939 | Mascuch et al. | 114/117 |
| 2,440,764 A | * | 5/1948 | Wilson | 49/371 |
| 3,571,977 A | * | 3/1971 | Abeel | 49/379 |
| 4,088,353 A | * | 5/1978 | Meyer | 292/36 |
| 4,722,151 A | * | 2/1988 | Westwell | 49/477.1 |
| 5,077,940 A | * | 1/1992 | LaRose, Jr. | 49/503 |
| 5,199,369 A | * | 4/1993 | Meyer et al. | 114/117 |
| 5,313,738 A | * | 5/1994 | Thakur et al. | 49/394 |
| 5,603,184 A | * | 2/1997 | Campbell et al. | 49/394 |
| 6,059,230 A | * | 5/2000 | Leggett et al. | 244/129.5 |
| 6,568,310 B2 | * | 5/2003 | Morgan | 89/36.02 |
| 6,684,570 B1 | * | 2/2004 | Robledo | 49/394 |
| 6,696,979 B2 | * | 2/2004 | Manten et al. | 340/945 |
| 6,698,690 B2 | * | 3/2004 | Novak et al. | 244/121 |

* cited by examiner

*Primary Examiner*—Hugh B. Thompson, II
(74) *Attorney, Agent, or Firm*—Bradley N. Ruben

(57) ABSTRACT

A door reinforcement system comprises two pairs of assemblies, each assembly having subassemblies on the inside and the outside of the door. The inside subassemblies include a plate with a channel for housing a sliding bolt, and may include three subassemblies with two bolts, each of which spans a subassembly attached to the wall structure and a subassembly attached to the door. By providing the at least two pairs of assemblies, a better reinforment is obtained by reinforcing against the torque that would be present with a single dead bolt.

7 Claims, 18 Drawing Sheets

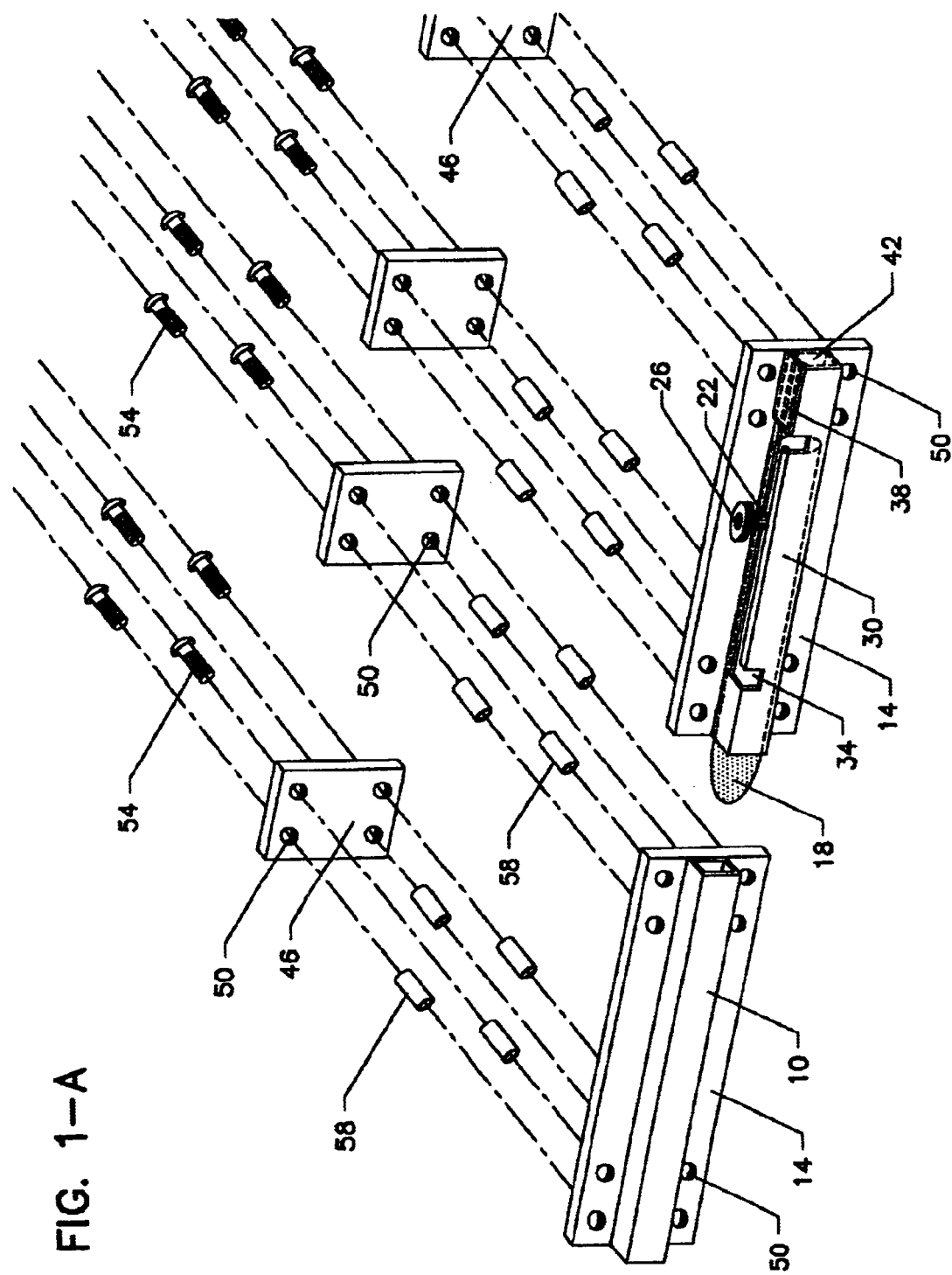
FIG. 1-A

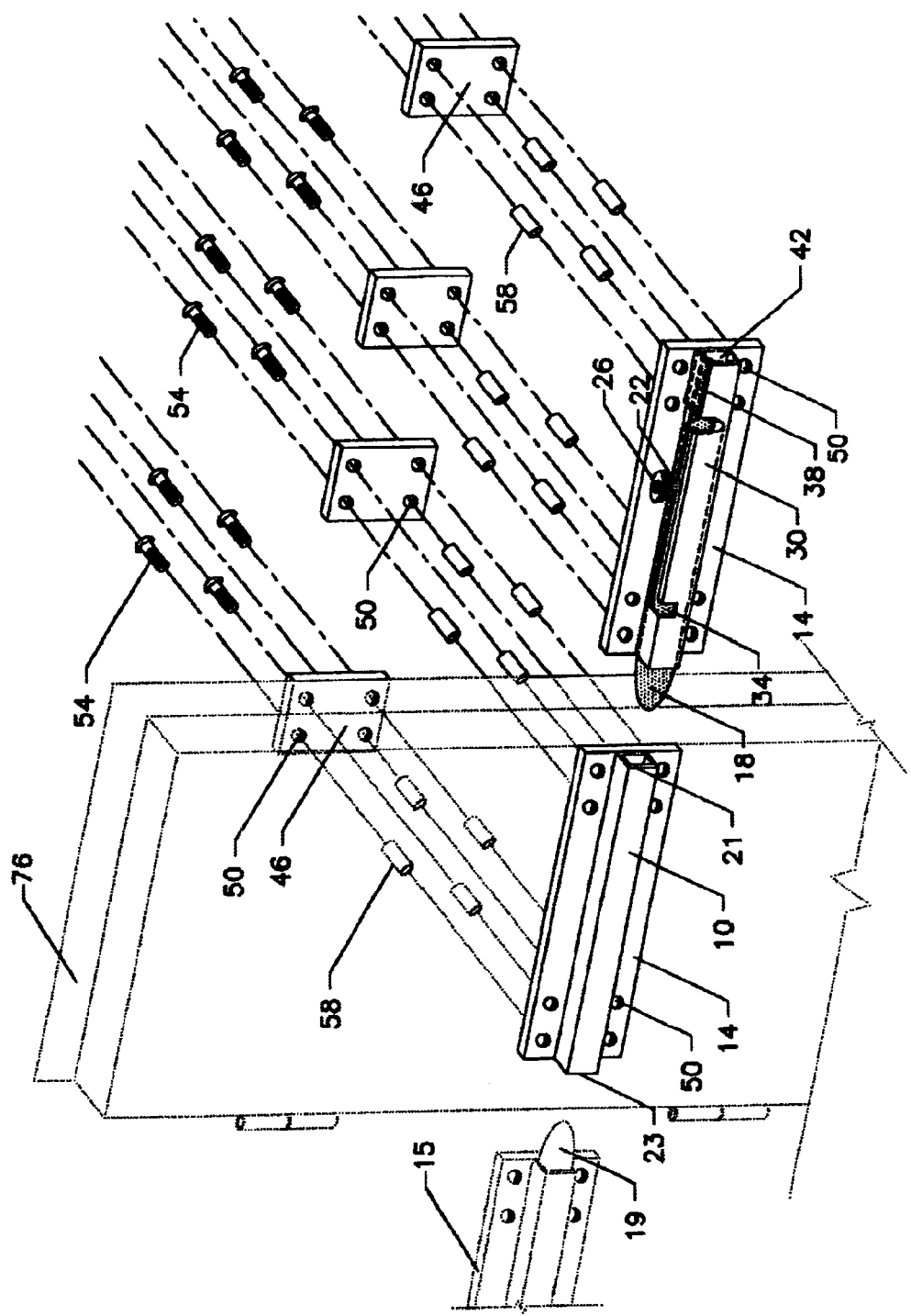
FIG. 1—A.1

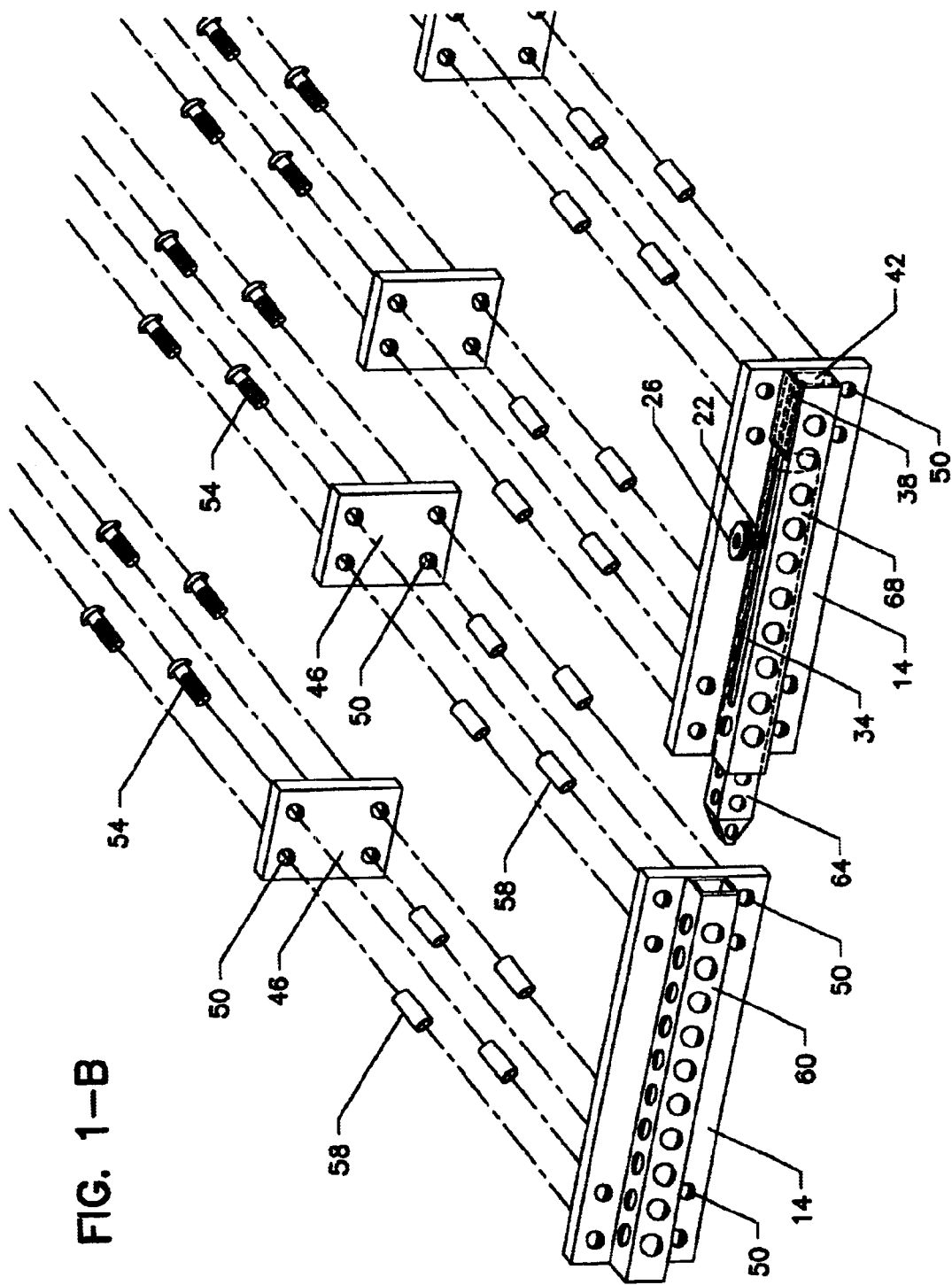
FIG. 1-B

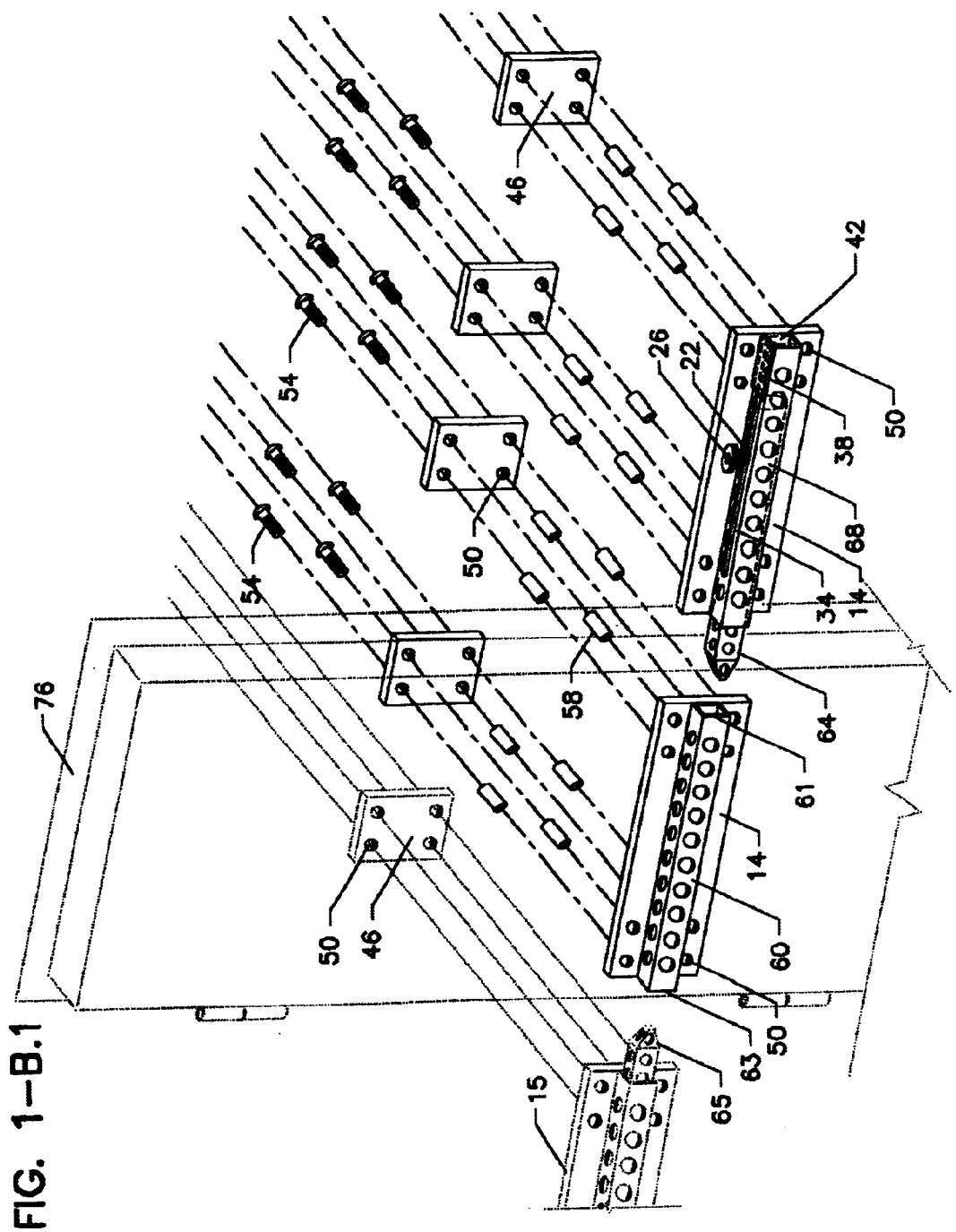
FIG. 1-B.1

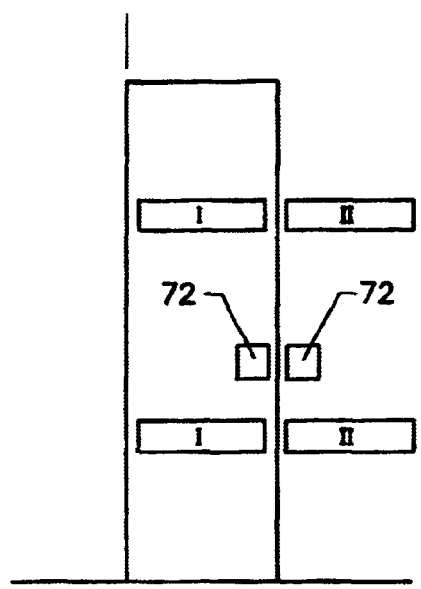
FIG. 2-A
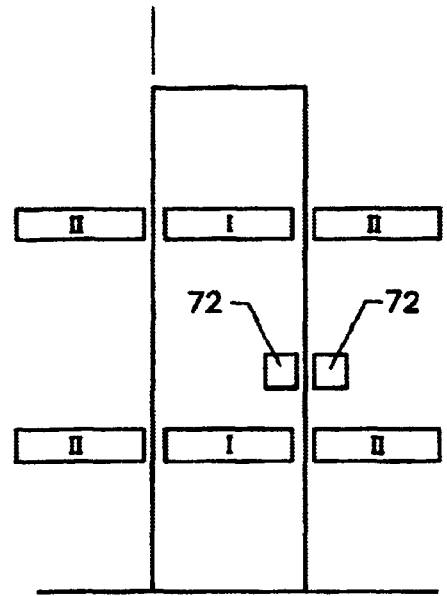
FIG. 2-B
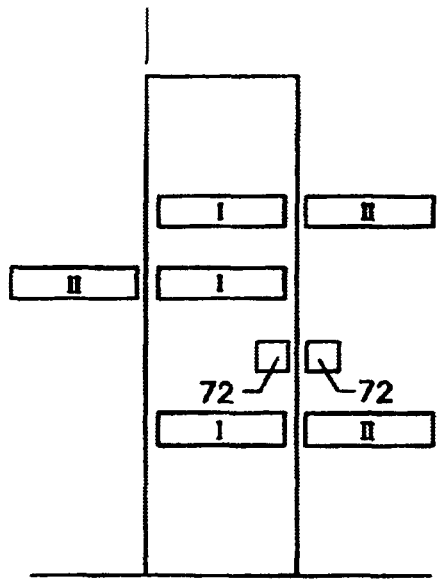
FIG. 2-C
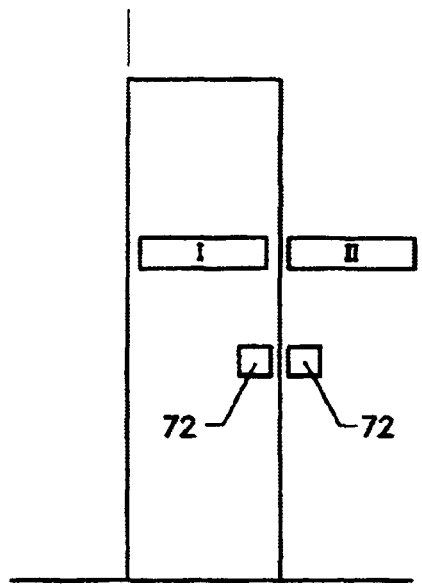
FIG. 2-D

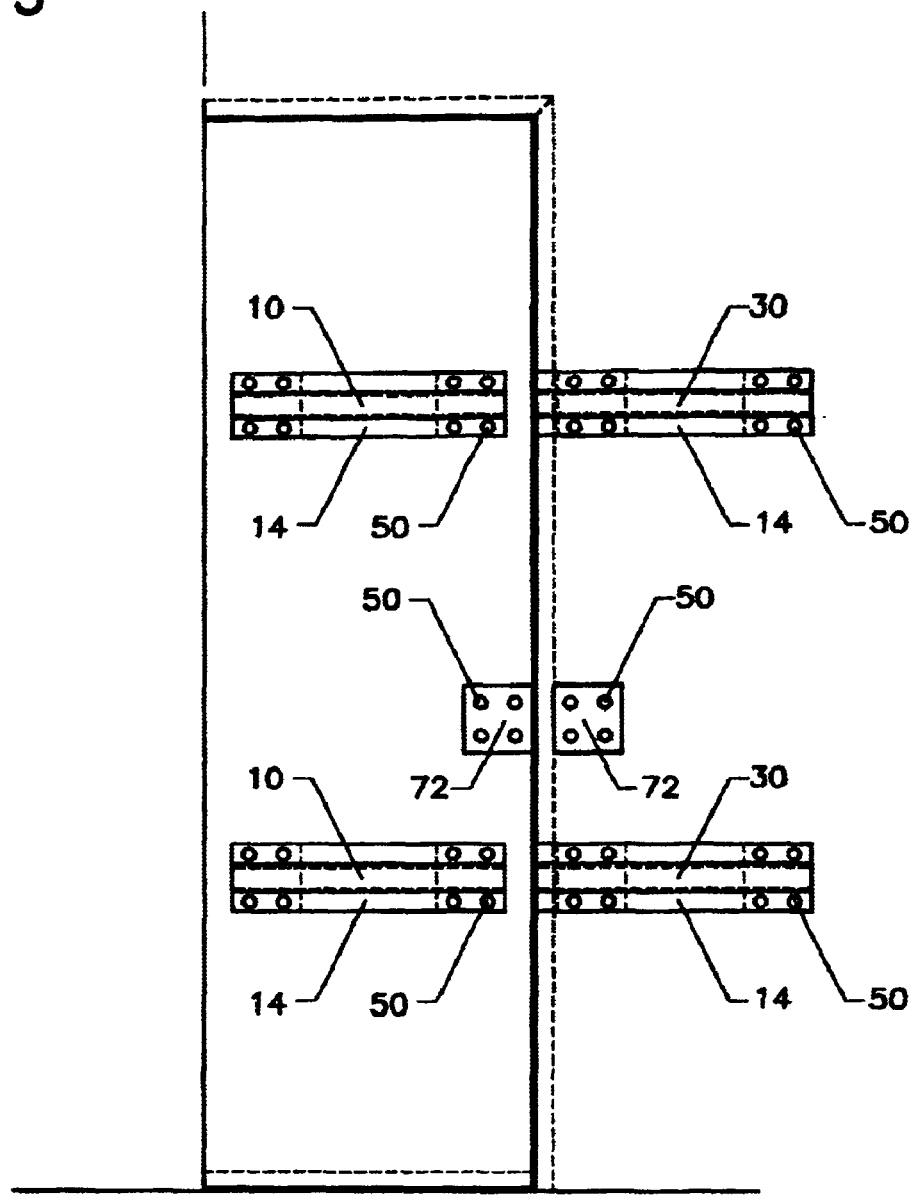

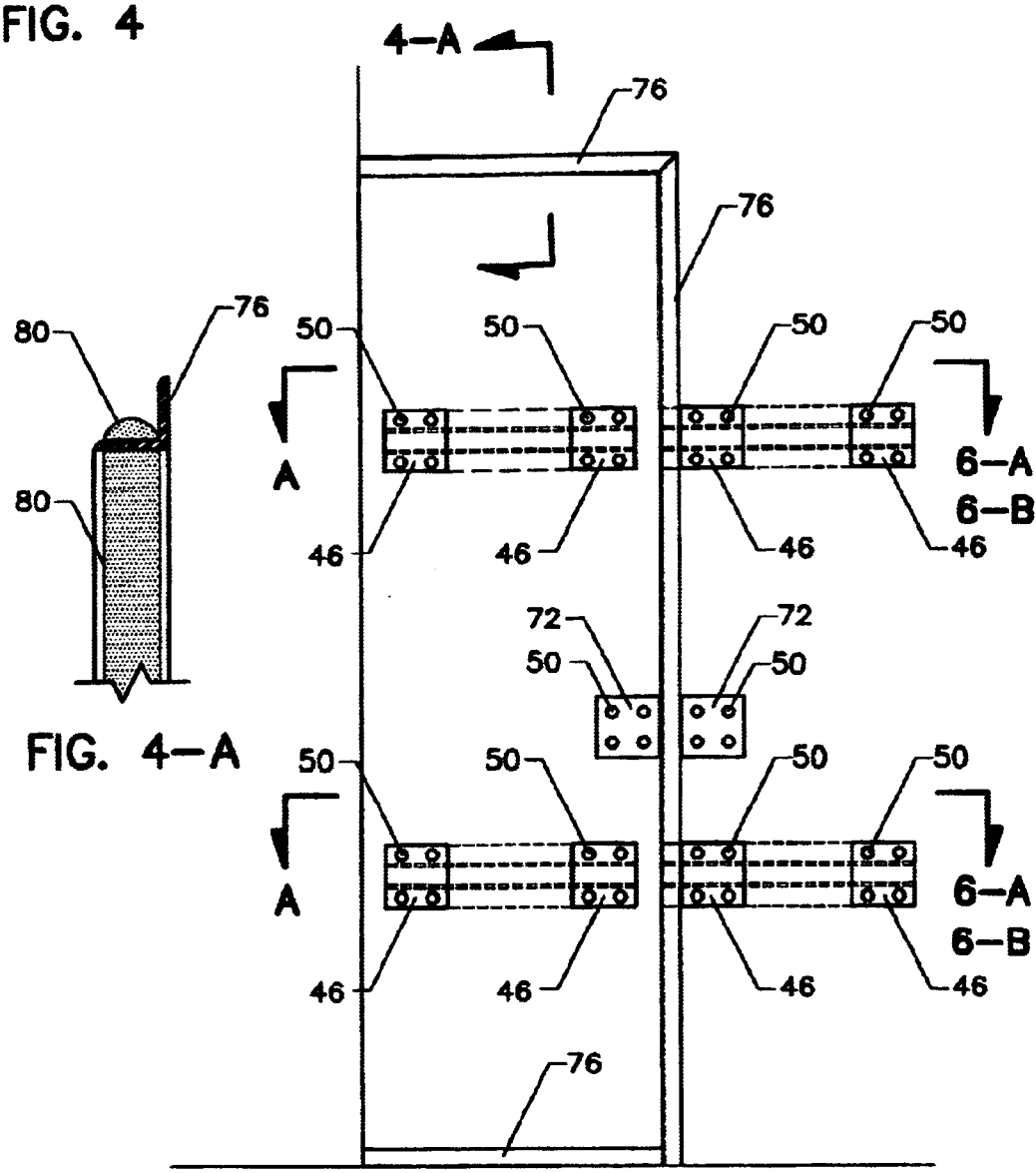

FIG. 5
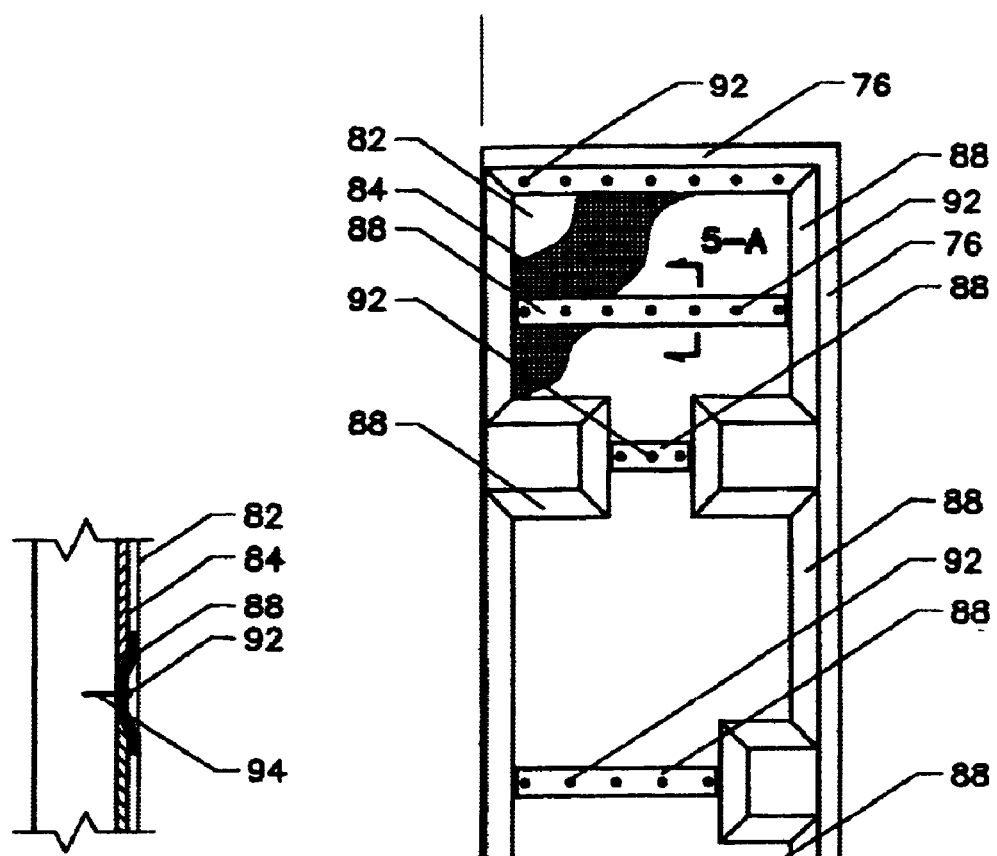
FIG. 5-A
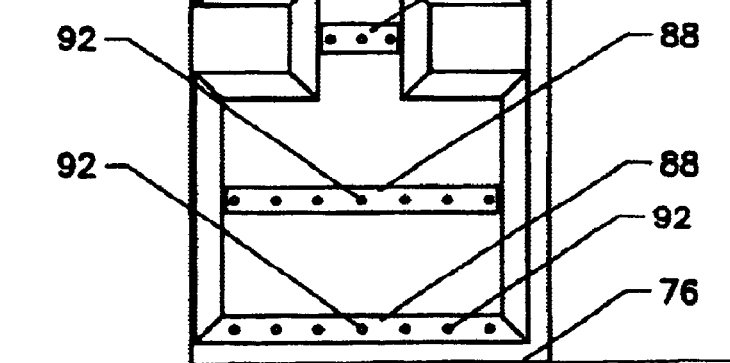

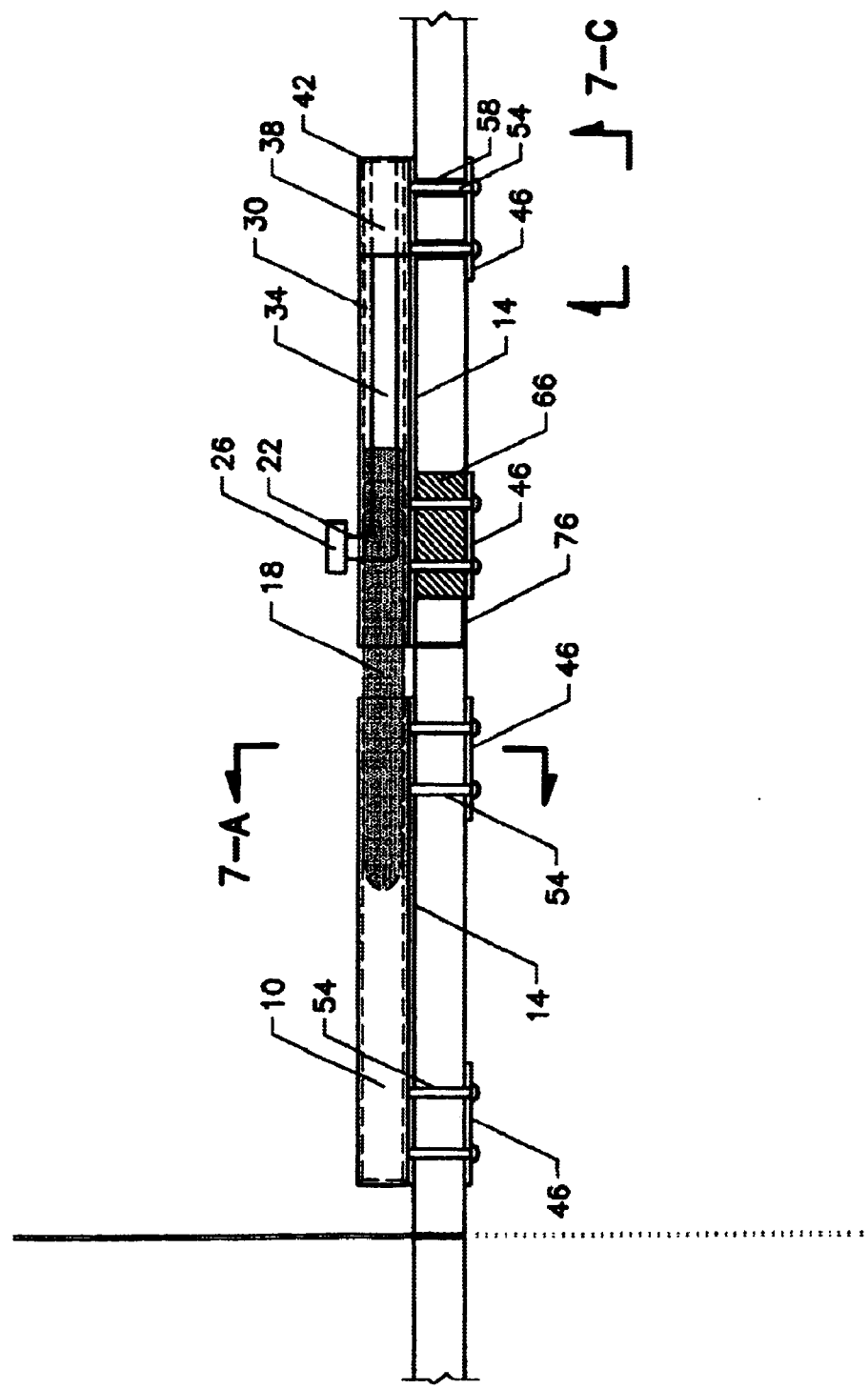

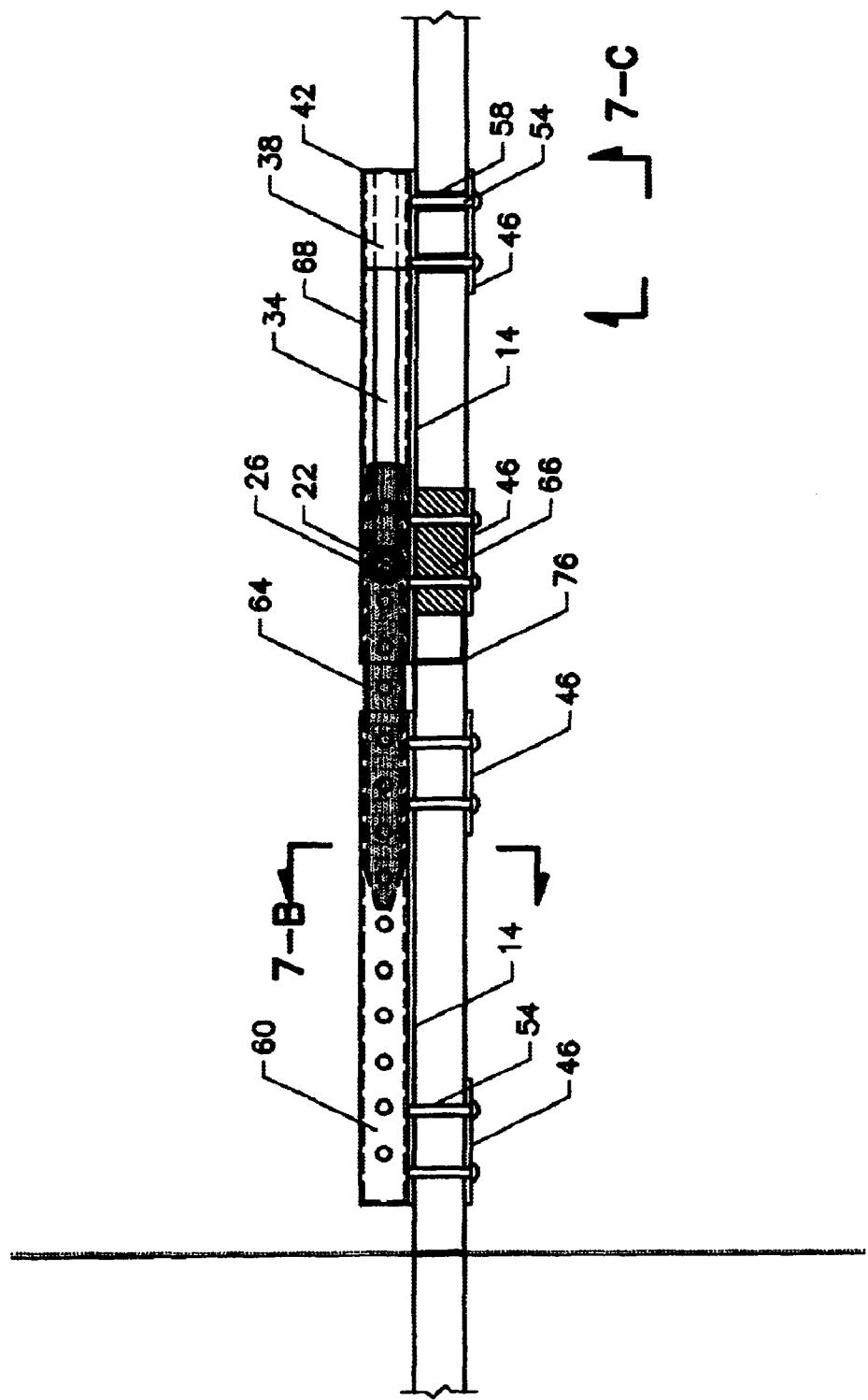
FIG. 6-B

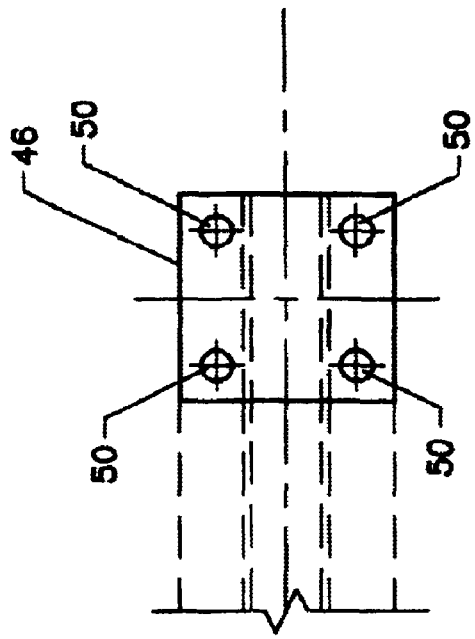
FIG. 7-C
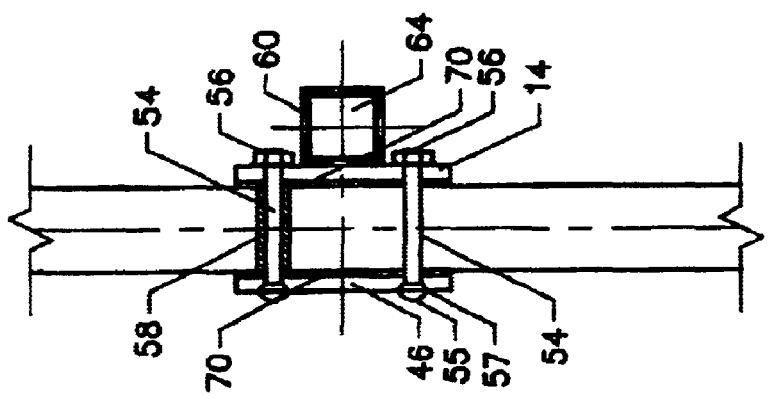
FIG. 7-B
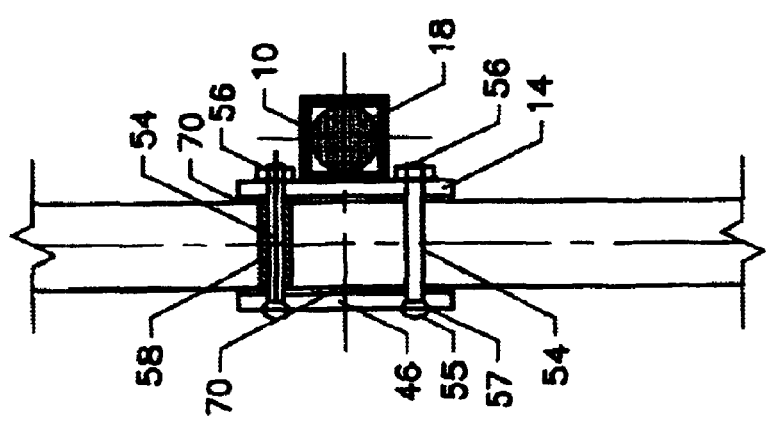
FIG. 7-A

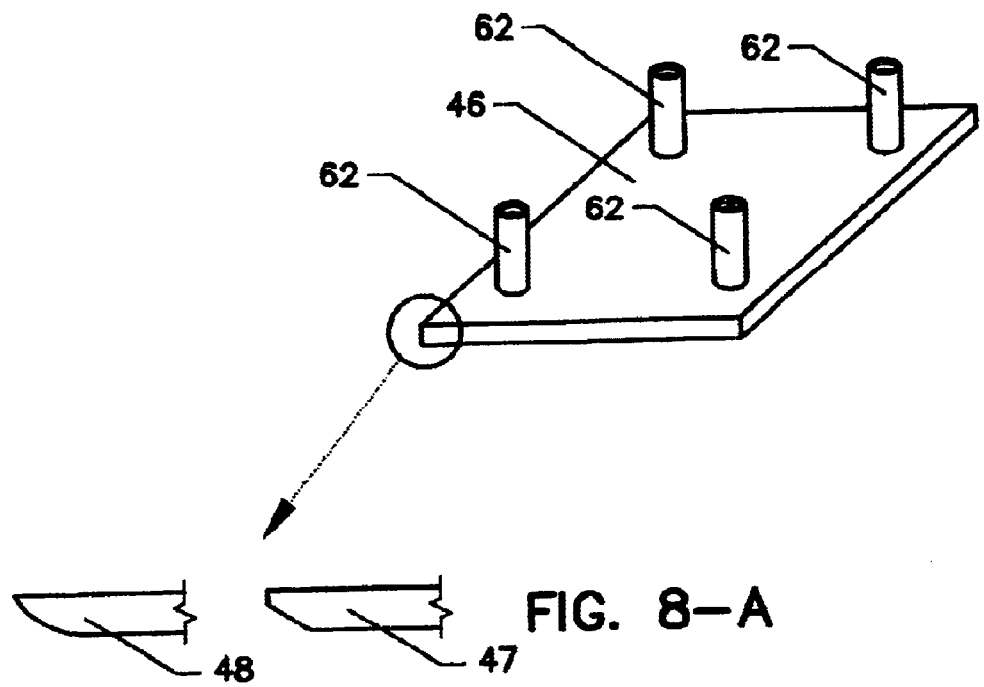
FIG. 8-A
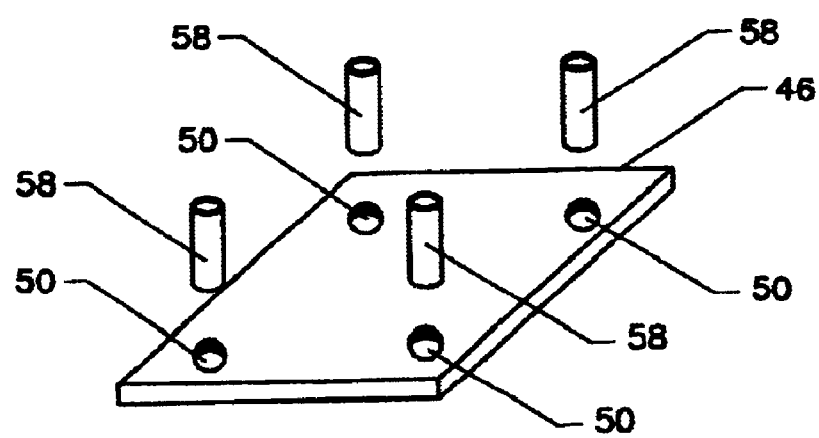
FIG. 8-B

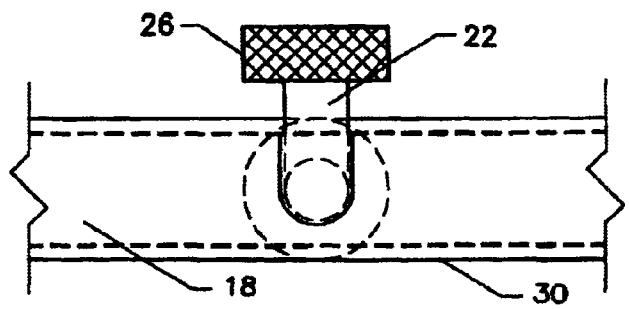
FIG. 9-A
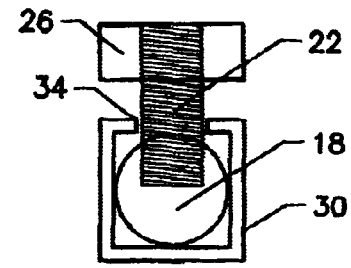
FIG. 9-A.1
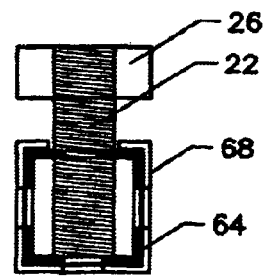
FIG. 9-A.2
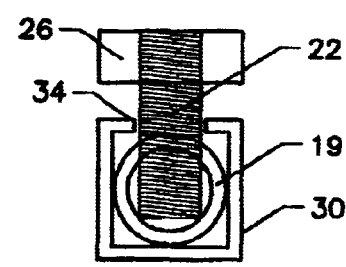
FIG. 9-A.3
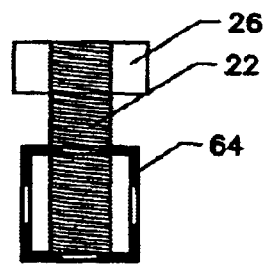
FIG. 9-A.4
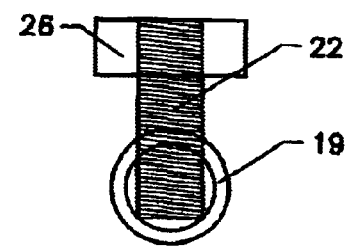
FIG. 9-A.5

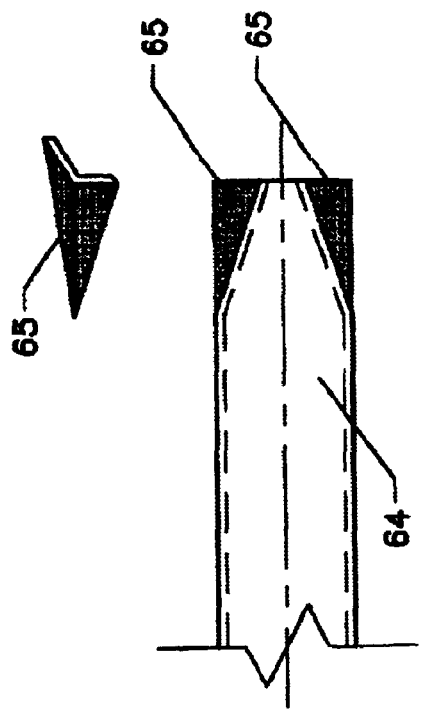
FIG. 10-A
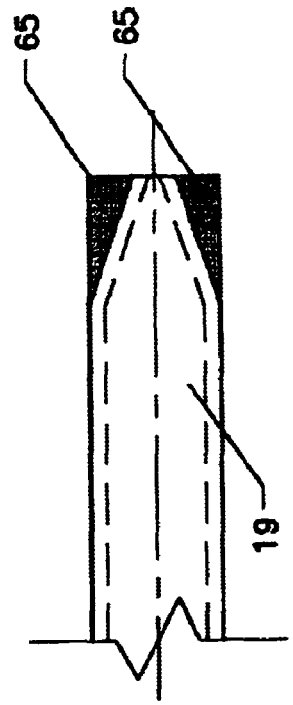
FIG. 10-B
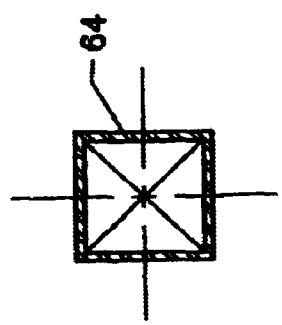
FIG. 10-A.1
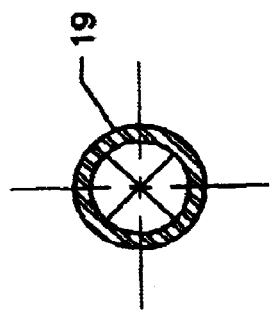
FIG. 10-B.1

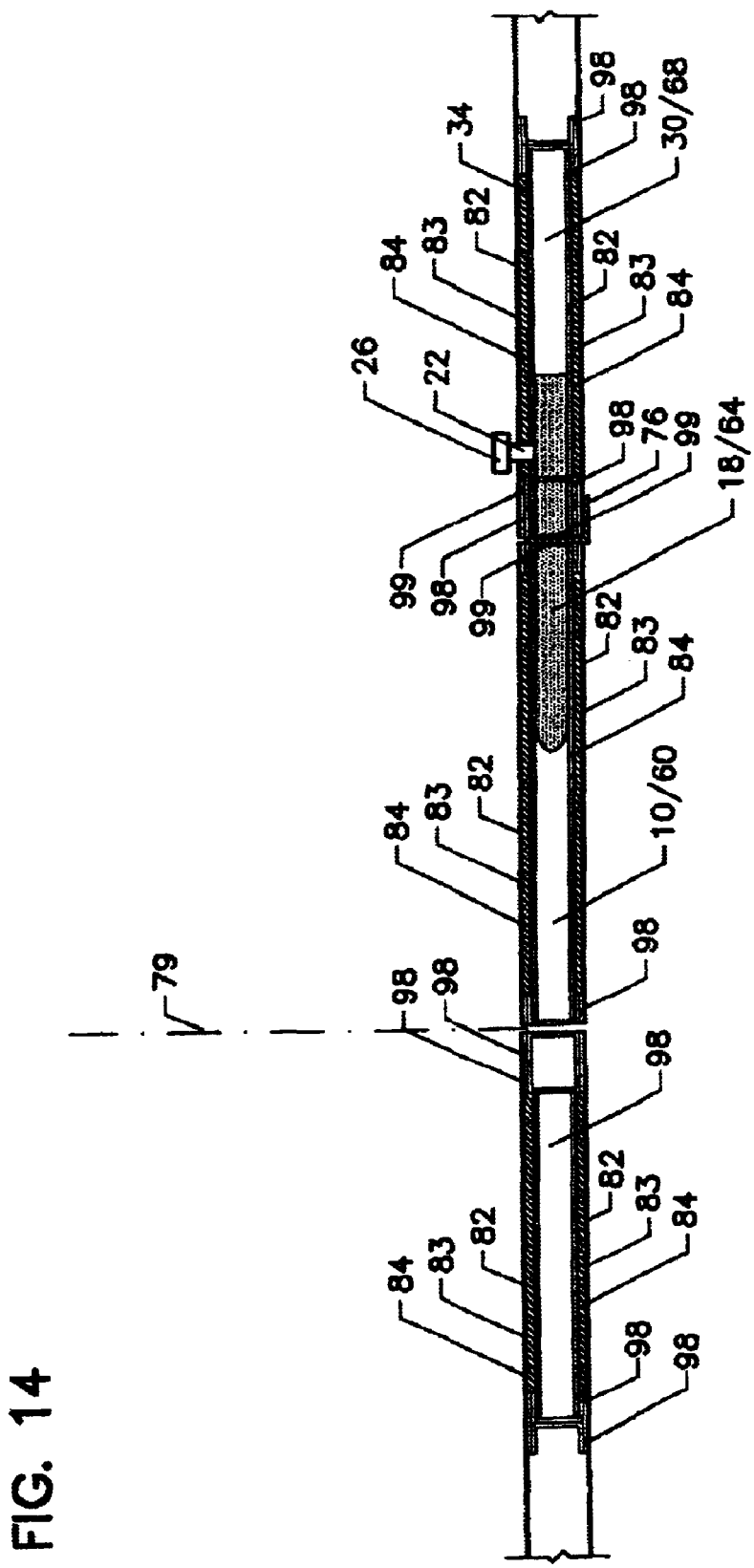

DOOR REINFORCEMENT SYSTEM

BACKGROUND OF THE INVENTION

1. Field of the Invention

The invention relates to door reinforcement systems and locking mechanisms having an outside (passenger) and an inside (cockpit), which is applicable to both existing and new door installations, to both single and double leaf doors, adaptable to different size openings, and addresses a wide range of security concerns and applications.

2. The State of the Art

Typical mechanisms and structures for securing doors delve back centuries. The dead bolt is used conventionally on a myriad of doors, and is often a sliding or keyed dead bolt. A typical locksmith will also stock other reinforcing brackets, usually to strengthen the door around the lock, to prevent an intruder from prying the door open, and the like.

The following U.S. patents disclose various mechanisms and structures for securing doors: U.S. Pat. Nos. 309,813; 374,724; 990,446; 2,212,155; 3,704,845; 4,180,943; 4,522,359; 4,999,949; 5,080,354; 6,158,692; and 6,260,304.

SUMMARY OF THE INVENTION

In one embodiment, this invention provides a reinforcement system for a door having an outside (passenger) and an inside (cockpit), the door housed in a wall (bulkhead), comprising two pairs of assemblies spaced from each other, each assembly comprising a door subassembly mounted on the door inside and a wall subassembly mounted on the wall inside, each subassembly comprising a channel adapted to accomodate a bar (dead bolt), wherein the channels for the subassemblies in each assembly are co-linear allowing the bar to slide within, fit within, and connect a door subassembly and a wall subassembly, one bar for each assembly, and at least one protective cover for each subassembly mounted on the outside and connected to the corresponding subassembly on the inside.

Once the system is in place, it will considerably increase the load resisting capacities of the existing or new doors. Under the loads associated with attempts of forced incursion, the system will simultaneously engage both the door and the adjacent wall(s), thus utilizing and combining their inherent strength with that of its own. Consequently, it will enable the door to virtually become an integral part, by strength, with the surrounding/adjacent wall (bulkhead), and hence rendering the incursion attempt obsolete.

Additionally, the system covers a wide range of security concerns and applications, as, depending on the embodiment, the system provides deterrence capabilities against projectile penetration (e.g., bulletproof), considerable prevention of inward fluid flow (e.g., biochemical, airborne, and/or liquid agents), and maintenance of air pressure in the areas to be secured.

The system construction or fabrication is preferably entirely modular. It consists of prefabricated—ready to install assemblies, which are constructed of readily available standard sections and shapes (e.g., off-the-shelf items). The combined benefits of fast track, namely controlled fabrication and the resulting simple and quick installation procedures, make the system affordable, and ideal for rapid reinforcing and retrofitting applications, thus achieving security objectives and saving considerable time and funds. The system is constructed preferably of metal, preferably aluminum, high strength steel, or titanium, although reinforced polymeric parts can be used.

BRIEF DESCRIPTION OF THE DRAWINGS

FIG. 1-A shows an idealized exploded view of a reinforcement assemby according to this invention.

FIG. 1-A.1 shows an idealized exploded view of the multiple assemblies and their relationship to the door being reinforced.

FIG. 1-B shows an exploded view of two assemblies of another embodiment.

FIG. 1-B.1 shows a view like in FIG. 1-A.1 using the assemblies of the embodiment shown in FIG. 1-B.

FIGS. 2-A, 2-B, 2-C, and 2-D illustrate different idealized configurations of the reinforcement structures of this invention in relation to a door being reinforced.

FIG. 3 is an idealized plan view from inside a door reinforced with a pair of assemblies.

FIG. 4 is an idealized plan view as in FIG. 3, but from the outside of the door.

FIG. 4A is an idealized cross sectional view at the top of the door showing sealing against fluid penetration.

FIG. 5 is an idealized inside view showing the construction of a reinforced door.

FIG. 5A is an idealized cross sectional view through one of the metal straps reinforcing the door shown in FIG. 5.

FIG. 6A is a cross sectional view as shown in FIG. 4 of the sliding bolt mechanism and assemblies.

FIG. 6B cross sectional view as shown in FIG. 4 of the sliding bolt mechanism and assemblies of a different embodiment.

FIG. 7-A is a cross sectional view as seen in FIG. 6-A.

FIG. 7-B is a cross sectional view as seen in FIG. 6-B

FIG. 7-C is a cross sectional view as seen in FIGS. 6-A and 6-B.

FIGS. 8-A and 8-B show different embodiments of the reinforcing plates.

FIGS. 9-A and 9-A.1 through 9-A.5 show cross-sectionally embodiments of the handle for the bolt and alternative methods for connecting the handle.

FIGS. 10-A, 10-A.1, 10-B, and 10-B.1 show various structures for the sliding bolt and the point at the end thereof.

FIG. 14 is a cross section as indicated in FIG. 13 showing the sliding bolt within a new door construction.

DETAILED DESCRIPTION OF SPECIFIC EMBODIMENTS

Figure 11:
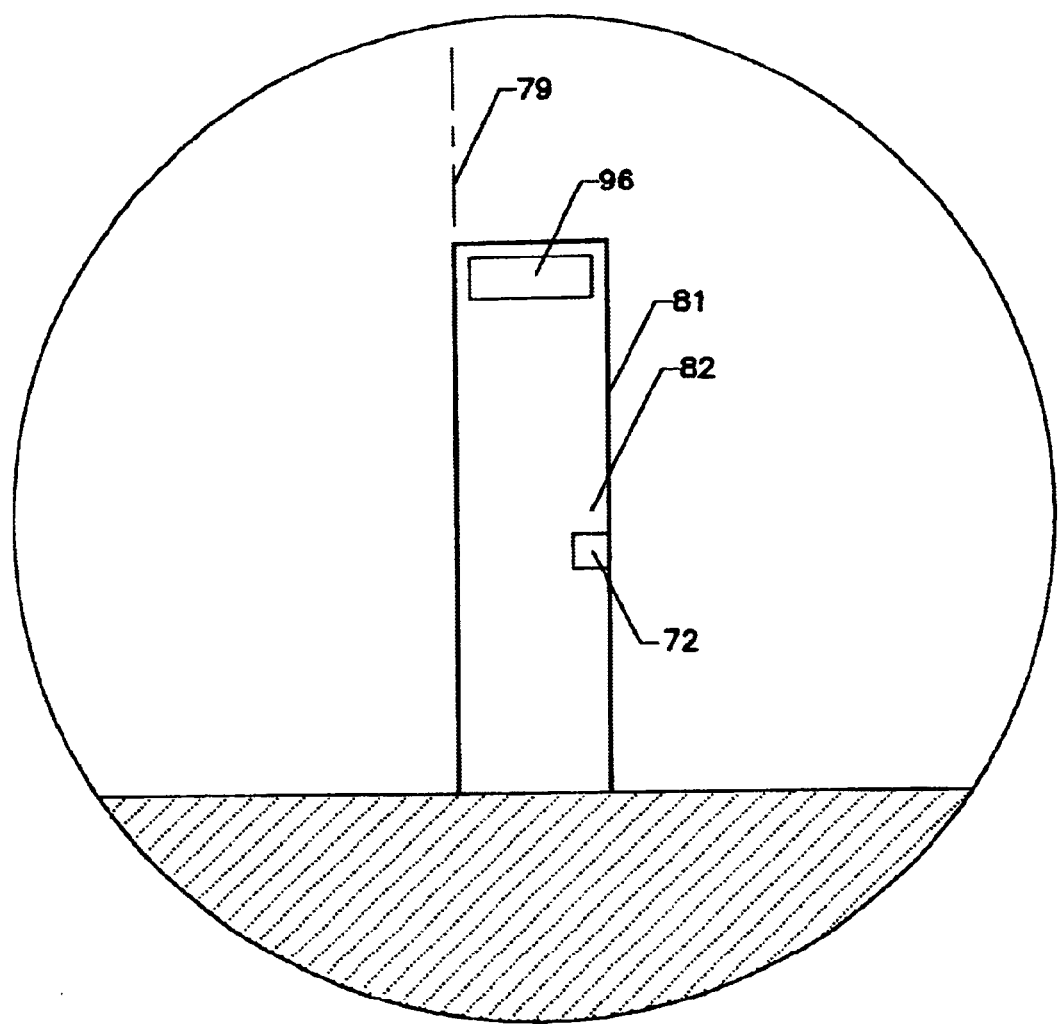
FIG. 11 is an idealized elevation/cross section through a fuselage showing a new door construction.

The invention comprises two pairs of assemblies spaced from each other; each assembly consists of a subassembly and two connecting plates. One subassembly is mounted on the inside face of the door (cockpit), and the other subassembly is mounted on the inside face of the wall (bulkhead). The connecting plates of the subassemblies are mounted on the outside faces (passenger side) of door and wall (bulkhead). Two schemes are presented; tubular-section scheme shown in FIG. 1-A, and perforated strut-section scheme shown in FIG. 1-B.

Each subassembly consists of a standard tubular 10 or strut 60 section welded along two of its sides to a continuous plate 14. The tubular 10/strut 60 section is adopted to accommodate and house a movable part which could be also solid bar 18, pipe 19, or strut 64. The movable part is fitted with a handle preferably consisting of a short threaded stem 22 and a screwed-on round threaded nub 26.

The handle facilitates proper operation including back and forward motions, and locking and securing of the movable part 18/64. The tube 30/strut 68 housing the movable part 18/64 is fitted with a long slotted cut 34 with right-angle returns at its ends. In some cases, to facilitate placing of the movable part inside the tube, the long slotted cut 34 may be extended through the far end of the tube 30/strut 68, and a cover plate 38 connected to the top of the tube 30/strut 68 once the movable part is in place. The long cut 34 serves to maintain and control the mobility and travel distance of the movable part 18/64. At the locking/securing position the handle may be rotated at a right angle and in the embodiment shown a nub 26 is tightened to bear against the top/sidewall of the tube 10/strut 60. Preferably, sil tubes and struts are fitted with cap plates 42 at their far ends.

For each assembly, the connecting outside-plates 46 have the same width dimension as the subassemblies' continuous inside-plates 14. The inside 14 and outside 46 plates can have predrilled matching holes 50 and can be connected together via bolts 54 through the existing door or wall (bulkhead). In all cases the bolts should have smooth round heads 55, or heads that require special wrenches to tighten/un-tighten for purposes of security. Likewise, the nuts should be installed on the inside face of the door/wall (bulkhead) with oversized-lock washers 56. The holes receiving bolt heads may be grooved 57 to guard against prying.

For better installation and to maintain the distance between the inside and outside plates, metal spacers/collars 58 or packing-material blocks 66 are provided continuously or at the predrilled-hole locations 50, and neoprene padding 70 is installed between the plates 14/46 and the faces of the door/wall (bulkhead).

For an even higher level of security, only the inside continuous plate will have predrilled holes 50 to accommodate bolts' 54 installation, while the holes in the outside connecting plates will be eliminated. To achieve proper connection between the subassemblies and the outside plates 46, threaded spacers/collars 62 are welded all around to the inside faces of the connecting plates 46, whereby the locations of these spacers 62 will align with, and register with those of the predrilled holes 50 in the continuous plate 14. The connecting bolts 54 will then be passed through the holes 50, and properly tightened into the threaded spacers 62.

As seen in FIG. 1-A.1, an opposing assembly with plate 15, movable part 19, and analogous structure can be placed on the other side of the door, so that movable part 18 enters opening 21 in tubular section 10 spanning between the two, and movable part 19 enters opening 21 in the same tubular section 10 spanning between the two. Similarly with respect to FIG. 1-B.1, an opposing assembly with plate 15, movable strut 65, and the like can be used in combination with the strut 64, the latter being accomodated in opening 61 spanning the two assemblies, and the former being accomodated in opening 63 at the other end of the strut section.

The door/wall (bulkhead) assemblies could be installed in several arrangements and combinations based on location specifics and security requirements. FIG. 2A-through-FIG. 2-D illustrate some preferred combinations.

FIG. 3 shows the door elevation facing the inside (cockpit side), with two installed pairs of subassemblies (higher and lower) depicted by solid lines, and the outside connecting plates 46 on the far side depicted by dotted lines. It also shows four protective cover plates 72, two at each side of the door, at the conventional lock location.

FIG. 4 shows the same elevation facing the outside (passenger side), with the solid lines depicting the out side connecting plates 46, and the dotted lines the subassemblies on the far side. It also shows light angle 76 connected to the top, bottom, and lock sides of the door. The angle 76 is mitered at the corners and serves multiple purposes, it will prevent prying of the door with the use of an instrument, provide additional resistance to ramming by bearing against the bulkhead/doorjamb, and facilitate high level of air tightness through the installation of rubber gland 80 along the length of its horizontal leg thus preventing fluid inflow and maintaining air pressure. FIG. 4-A shows detailed section through the angle 76 and rubber gland 80 to deter passage of fluids, includes gases carrying airborne fumes or pathogens, or liquids that might carry the same.

To provide deterrence against projectile penetration, the outside (passenger side) face of the door is covered with bulletproof fabric/rigid board 84, which is secured in place by metal straps 88 with predrilled holes 92 for self-tapping screws 94, the arrangements and locations of these straps 88 will clear the locations of all connecting 46 and protective 72 plates. The door will be enclosed in appropriate cladding 82, preferably fiberglass carbon reinforced material. FIG. 5 shows door elevation with the bulletproof material 84, and metal straps 88. FIG. 5-A shows detailed section through cladding 82, bulletproof material 84, and its supporting metal straps 88.

FIG. 6-A shows a horizontal section through the door and wall (bulkhead) for the tubular section scheme, the section is taken parallel to the length dimension of the assemblies, and shows all components of the assemblies; the subassemblies' tubes 10/30 and continuous plate 14 mounted on the inside faces of door and wall (bulkhead), and the connecting plates 46 mounted on the outside faces of door and wall (bulkhead). FIG. 6-B shows the same section as FIG. 6-A, for the perforated strut-section 60/68 scheme.

FIG. 7-A and FIG. 7-B shows vertical sections cut through the assemblies and door/wall (bulkhead) for the tube 10/30 scheme and strut 60/68 scheme respectively.

FIG. 7-C shows plan detail of an outside connecting plate 46 and the locations of the bolts predrilled-holes 50/spacers 58 in relation to that of the tube/strut. FIG. 8-A shows perspective of an outside connecting plate 46 with threaded spacers/collars 62 welded to its inside face, it also shows the typical machine beveled finish of plate edges and corners 47/48. FIG. 8-B shows the same type plate 46 with bolts' predrilled-holes 50, and the loose spacers/collars 58.

FIG. 9-A shows in solid line, the movable part's handle in the upright position, and its rotated locking position in dotted line. FIG. 9-A.1 through FIG. 9-A.5 show methods of connecting the handle's stem 22 to alternatives of the movable part, such as solid bar 18, pipe 19, and strut 64 sections.

FIGS. 10-A and FIGS. 10-B show methods of forming the pointed nose of the movable parts made of hollow sections such as struts 64, and pipes 19. By cutting four equal right angle wedges 65 at the desired nose location, and subjecting the section at this location to uniform pressure from mechanical press, the walls of the cut section will move inward to form a pointed nose.

FIG. 11 through FIG. 14 describe new door/wall construction, and reinforcement system/locking mechanism which confirms to the above specifications and requirements of the existing door with the exception, the inside/outside mounting plates are eliminated.

The entire door/wall (bulkhead) framing preferably comprises standard, readily available metal stud channels, whereby the door reinforcement system/locking mechanism is fitted within the framing of the door/wall (bulkhead), and a "hardened panel" is constructed on each side of the door to further enhance security capabilities. As in the existing door, the system provides for projectile deterrence, maintenance of air pressure, and prevention of fluid inflow into the cockpit or the area to be secured.

The door framing preferably comprises metal-stud channels 98, joined together to form a box frame, whereby the channels' flanges are oriented inward to face the inside of the box, mitered and welded at the corners. A light angle 76 can be welded to the door framing on three sides to accommodate the installation of rubber gland 80 for air pressure maintenance and to prevent fluid inflow to the cockpit or the area to be secured, and protective cover plates 72 are provided at the conventional lock location.

The wall (bulkhead) framing comprises standard metal-stud channels arranged as top and bottom horizontal tracks 102 connected to the superstructure, vertical stud risers 98 connected to these tracks, and horizontal bracing (bridging) 98/header 98 connected to the risers. The hardened panels are formed, one on each side of the door, by doubling the framing members 98/98 (back-to-back or face-to-face) of the doorjamb and subsequent stud risers 98.

The reinforcement system comprises two pairs of standard tubular/strut metal-sections connected to, and fitted within the inside of the door/wall (bulkhead) framing. Each pair consists of a tube 10/strut 60 connected to the inside of the door framing, while the other tube 30/strut 68 to the inside of the wall (bulkhead) framing. To facilitate operation of the movable part 18/64, cut openings are made in the doorjamb 98/98, door framing 98, and the light angle 76 at the reinforcement system location(s).

FIG. 11 is an elevation-cross section through the fuselage, showing the new door 81, hinge line 79, alternative location for the decompression/blow-off panel 96, protective lock plate 72, and the wall (bulkhead).

Figure 12:
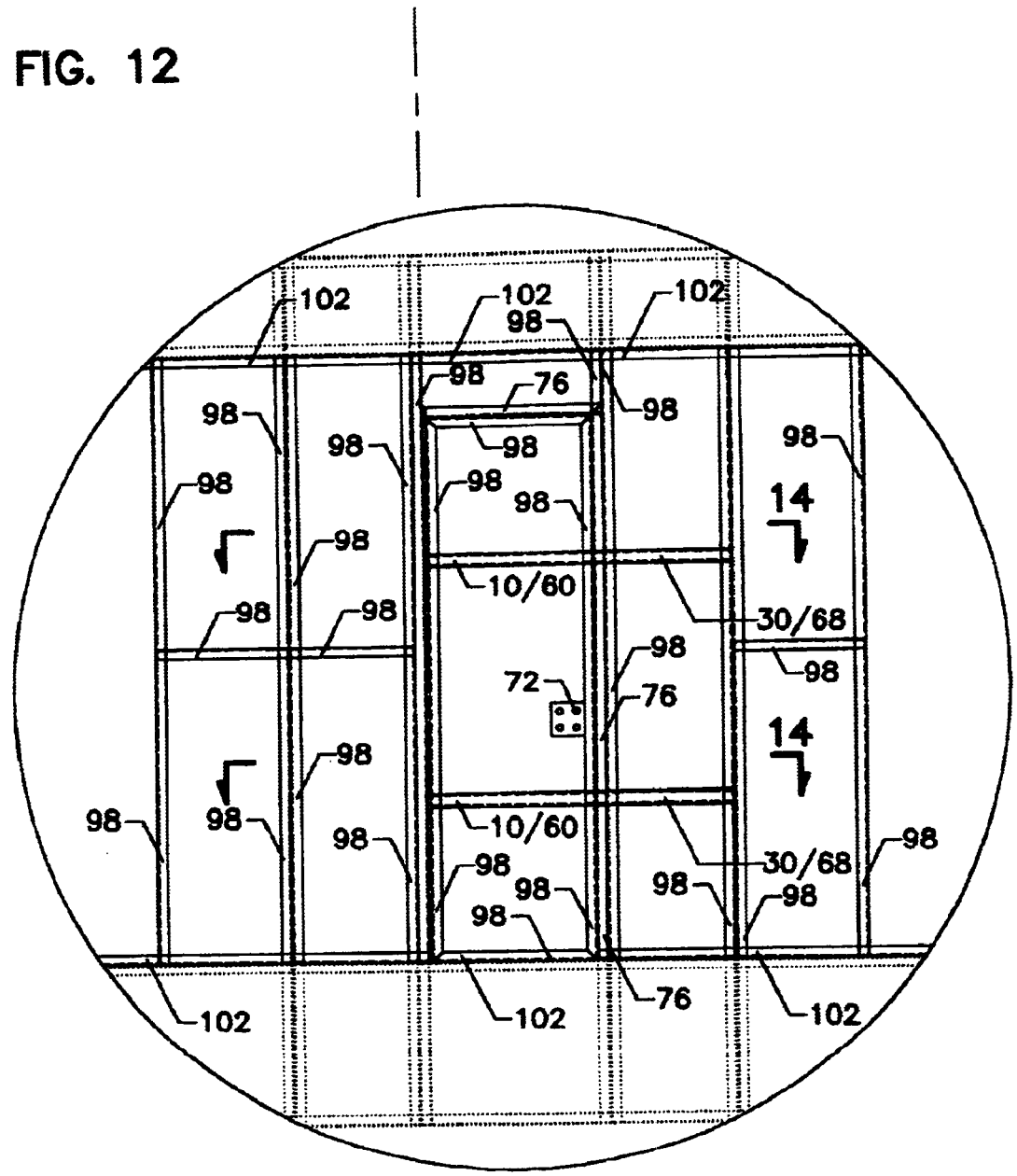
FIG. 12 is an idealized elevation/cross section through a fuselage as in FIG. 11 and showing the door and bulkhead reinforcement construction.

FIG. 12 is an elevation-cross section through the fuselage, showing the bulkhead framing components: top and bottom horizontal tracks 102, stud risers 98, bridging members 98, and double member framing of the hardened panels 98/98. It also shows the door framing 98, door tube 10/strut 60, wall tube 30/strut 68, light angle 76 for rubber gland 80, and lock protective plate 72.

Figure 13:
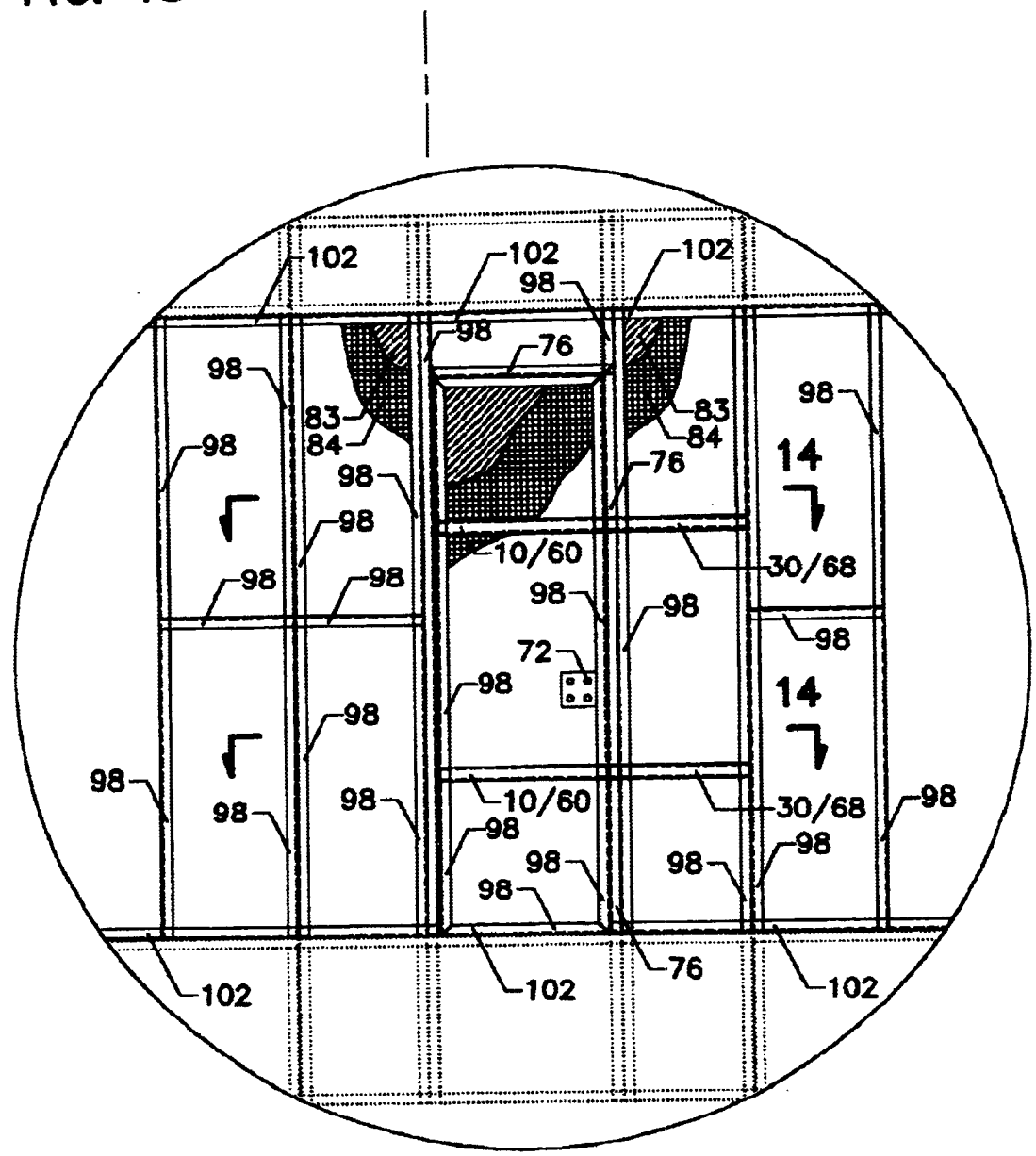
FIG. 13 is a view as shown in FIG. 12 having cutaway portions showing fabric reinfocement against penetration.

FIG. 13 is an elevation-cross section through the fuselage showing cladding 82, mesh 83, and bulletproof material 84.

FIG. 14 is a cross section through the door and bulkhead.

In light of the foregoing disclosure related particularly to securing aircraft cockpit doors, it will be appreciated by those skilled in these arts that the same or equivalent types of structures can be used to reinforce new or existing doors in such environments as homes, stores, security vehicles (e.g., armored trucks), and the like whereever a door structure exists or is fabricated.

What is claimed is:

1. A reinforcement system comprising a door having an outside and an inside, the door housed in a wall; comprising:

two pairs of assemblies spaced from each other, each assembly comprising a door subassembly mounted on the door inside and a wall subassembly mounted on the wall inside, each subassembly comprising a channel accommodating a bar, wherein the channels for the subassemblies in each assembly are co-linear allowing the bar to slide within, fit within, and connect the respective door subassembly and a wall subassembly; and at least one protective cover for each subassembly mounted on the outside and connected to the corresponding subassembly on the inside.

2. The system of claim 1, wherein the door has an integral knob and lock, further comprising on the outside a reinforcing cover to protect the lock.

3. The system of claim 1, wherein the door further comprises an L-shaped bracket attached to the door, one leg of the bracket flush with an outside edge of the door and the other leg extending beyond the door to cover any space between the door and the wall.

4. The system of claim 3, further comprising a gland on the inside of the L-shaped bracket preventing fluid flow between the door and the wall.

5. The system of claim 1, further comprising on the outside of the door at least one layer of fabric adapted to deter penetration of a projectile through the door, the fabric secured to the door by a metal framework.

6. The system of claim 5, wherein the framework comprises a metal edging around an edge of the door and a plurality of metal strips bridging the edging.

7. The system of claim 1, wherein the protective covers are connected to their corresponding subassemblies by welding to at least one metal bar connecting through the door to the corresponding subassembly.

* * * * *